April 24, 1945.   R. M. BARNHART ET AL   2,374,320
DROP LEG SUPPORT FOR TRAILERS
Filed Nov. 6, 1942   3 Sheets-Sheet 2

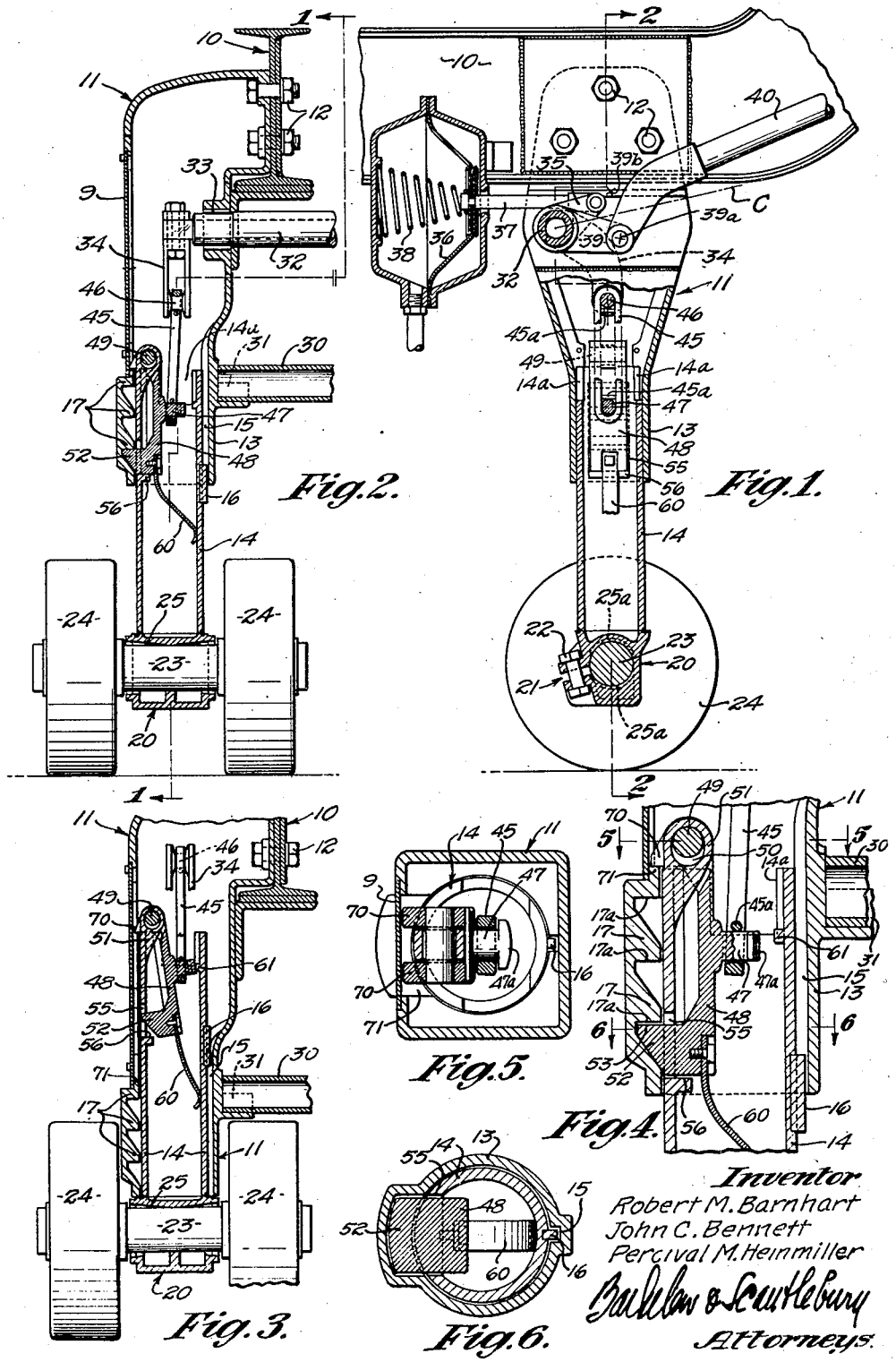

Inventors.
Robert M. Barnhart
John C. Bennett
Percival M. Heinmiller

Attorneys

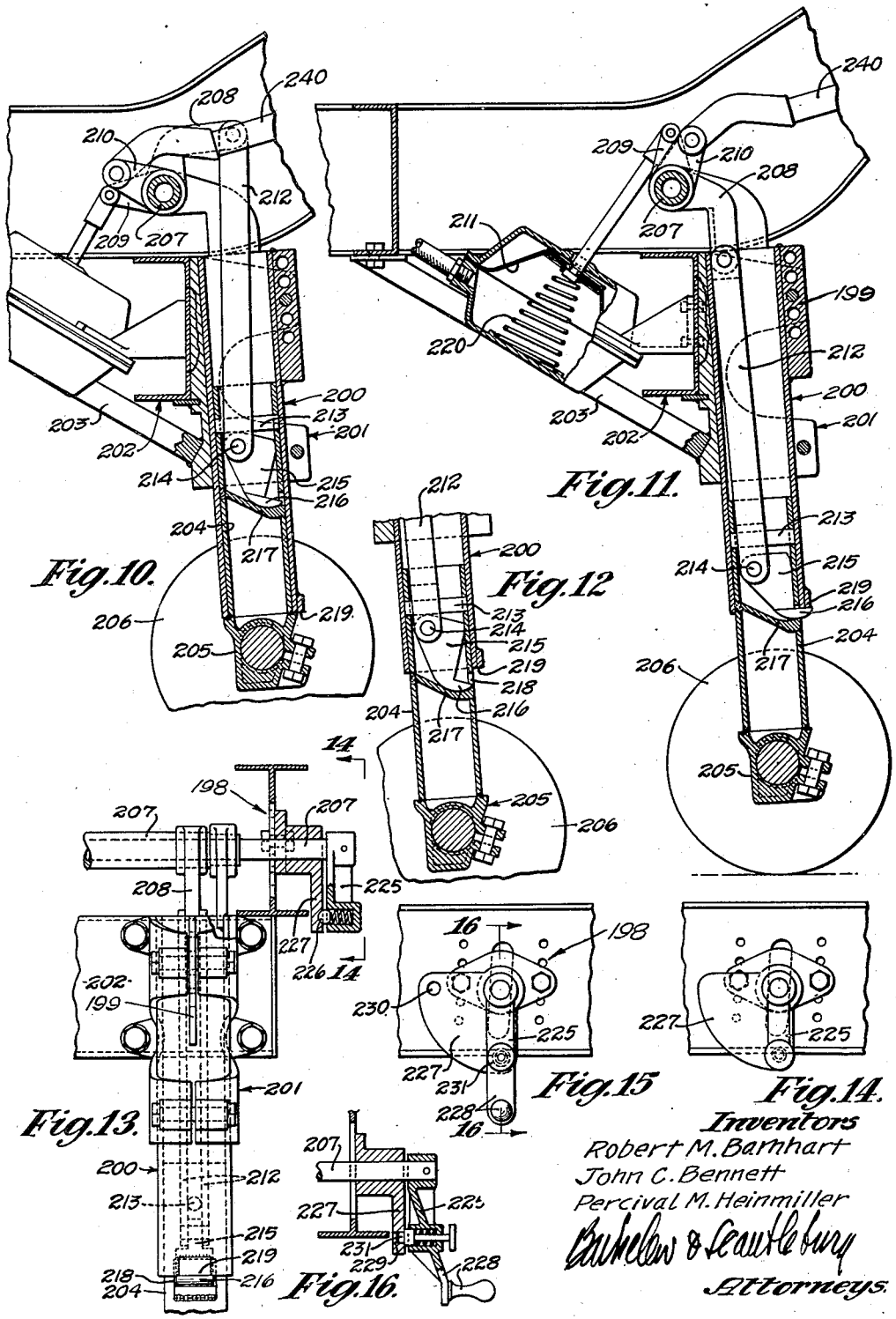

Patented Apr. 24, 1945

2,374,320

UNITED STATES PATENT OFFICE 2,374,320

DROP LEG SUPPORT FOR TRAILERS

Robert M. Barnhart, San Gabriel, John C. Bennett, Pasadena, and Percival M. Heinmiller, Los Angeles, Calif., assignors to Utility Trailer Manufacturing Company, Los Angeles, Calif., a corporation of California Application November 6, 1942, Serial No. 464,777

15 Claims. (Cl. 280—33.1)

This invention has to do with supports for semi-trailers, and its general purpose is the provision of a trailer support of the drop leg type of improved form, simplicity and reliability. Other objects and corresponding accomplishments of the invention will be understood from the following description of typical forms of the invention; but among those objects and accomplishments we may mention preliminarily the locking of the support in its lowered operative position, and in an adjusted lowered position.

In the operation of the support in accordance with this invention, the movement of lowering the support is followed by a final locking movement which locks the support in its lowered operative position. And that final locking movement, which locks the support effectively in its lowered trailer-supporting position, is utilized for the purpose of unlocking the coupler which connects the semi-trailer with the tractor or other towing vehicle. The operation is such that the coupler cannot be unlocked until the support is either finally locked or is finally put into a potential condition in which imposition of the trailer weight must cause final locking of the support. All of this results in maximum dependability, not only of the support, but of the whole interlocked system which includes the support and the coupler.

The improved type of support and its locking action may be cooperated with different types of couplers and coupler locking mechanisms. The one which we show and describe here is not, in and of itself, a part of the present invention, except insofar as it acts broadly in combination with the operation of support locking as hereinafter described. The coupler and its locking mechanism is the subject of a copending application Ser. No. 464,776, filed November 6, 1942, now Patent No. 2,355,775, dated August 15, 1944; and its showing in this application may be taken as typical of such couplers.

Typical and illustrative embodiments of the invention are shown in the accompanying drawings in which;

Fig. 1 is a view, partly in side elevation and partly in vertical section, showing one form of my improved support, this view being taken as indicated by line 1—1 on Fig. 2;

Fig. 2 is a vertical section taken as indicated by line 2—2 on Fig. 1, both these figures showing the support in its lowered operative position;

Fig. 3 is a fragmentary section, similar in aspect to Fig. 2, but showing the support in its raised or inoperative position;

Fig. 4 is an enlarged fragmentary section of certain portions shown in Fig. 2;

Fig. 5 is a horizontal section on line 5—5 of Fig. 4;

Fig. 6 is a horizontal section on line 6—6 of Fig. 4;

Fig. 10 is a fragmentary view in side elevation and vertical longitudinal section showing a modified form of support, in its upper or inoperative position;

Fig. 11 is a similar view showing the support lowered and in its operative supporting position;

Fig. 12 is a fragmentary section of certain parts shown in Figs. 10 and 11 showing an intermediate position;

Fig. 13 is a fragmentary front elevation of the parts shown in Fig. 11;

Fig. 14 is a fragmentary side elevation of certain parts shown in Fig. 13, taken in the aspect indicated by the line 14—14 on Fig. 13;

Fig. 15 is a similar view showing a modification; and

Fig. 16 is a detail section taken on line 16—16 of Fig. 15.

Figure 7:
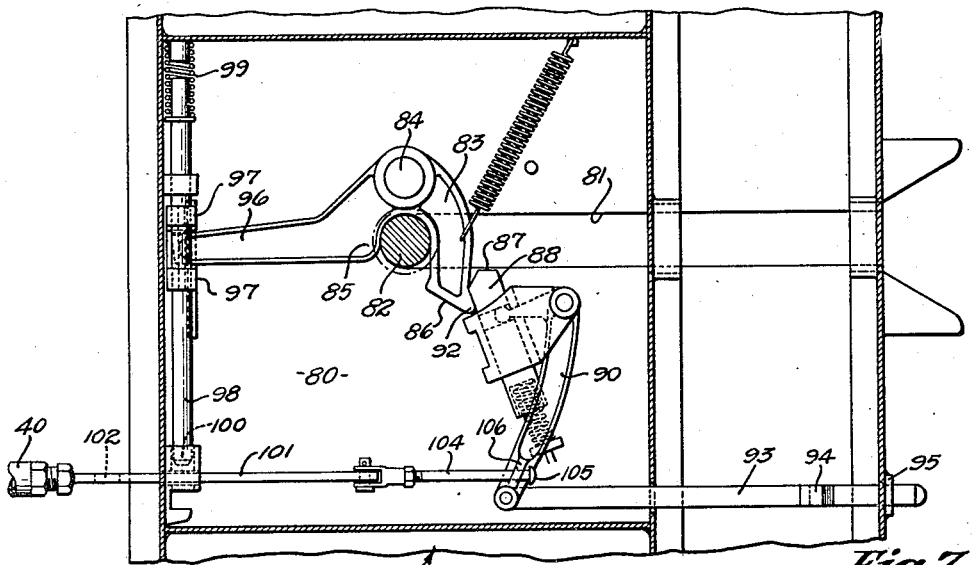
Fig. 7 is a fragmentary plan section showing the essential parts of the coupler and lock in their closed positions.

In the drawings a portion of the trailer frame is indicated at 10, the portions illustrated in Figs. 2 and 3 being one of the longitudinal side members of the frame. It will be understood that the supporting unit shown in these figures is preferably used in pairs, one at each side of the forward portion of the trailer; but as the units are duplicates it is necessary only to illustrate and describe one unit.

As typically illustrated in the drawings the supporting unit includes an upper hollow body member 11 which is preferably made as a steel casting of such configuration as to be easily mounted, at 12, on the trailer frame, and such as to provide accommodation for the other parts and mechanism of the supporting unit. A cover plate 9 affords access to the interior mechanism. This body member 11 extends downwardly from the frame and its lower end portion 13 is of circular tubular cross-section to take the vertically sliding tubular leg 14. Body portion 13 has a groove or splineway 15 to accommodate a spline 16 on the leg, to prevent rotation of the leg about its vertical axis. And the lower body portion 13 also is provided with a series of downwardly facing shoulders or teeth 17 in the form of downwardly facing ratchet teeth.

The lower end of tubular leg 14 is provided with a box 20, attached to the leg preferably by welding. The box is split as shown at 21 in Fig. 1 and has one or more contraction bolts 22 so that the box may be constricted more or less tightly about the stub shaft 23 which carries at its opposite ends two ground wheels or rollers 24. Bore 25 of box 20 is flared outwardly from the center at both top and bottom as indicated in dotted lines at 25a in Fig. 1 and as shown in full lines in Fig. 2. These flares are only present in the upper and lower portions of the bore of the box so that the stub shaft 23 is held in the box rigidly against displacement in a horizontal plane and at the same time is allowed a limited amount of tipping in a vertical plane. This tipping in the vertical plane allows both supporting wheels 24 to effectively engage an uneven or non-horizontal ground surface.

A cross stay or brace 30 is welded or otherwise secured at 31 to body 11 and extends across the width of the trailer to be likewise secured to the other supporting unit. An operating shaft 32, preferably tubular, likewise extends across the width of the trailer between the two units, being journalled therein at 33. At each end and within each unit body the operating shaft carries a crank arm 34. Mounted in any convenient position on shaft 32 there is an operating arm 35 which serves as the arm through which the shaft 32 is oscillated from any suitable operating mechanism or motor. The motor which is here typically shown is in the form of a vacuum actuated diaphragm 36 having a rod 37 connected to operating arm 35. The arrangement is such that application of vacuum to the lefthand side of diaphragm 36 will cause rotation of arm 35 and shaft 32 in a counter-clockwise direction in Fig. 1 and will lift supporting leg 14 through the medium of mechanism which is to be explained. Upon relief of the vacuum the leg may drop of its own weight, and a diaphragm spring 38 may aid movement of the parts in that direction. Relief of the vacuum is usually effected by breaking the vacuum line, which leads from the tractor to the trailer, preparatory to uncoupling.

Operating shaft 32 carries another arm 39 to which a control rod 40 is pivotally connected. This rod goes to and operates and controls the lock controlling mechanism of the coupler, as will be hereinafter described. Arm 39 bears certain angular relations to the operating crank 34 and rod 40, as will be hereinafter described, so as to effect certain cooperative control functions. Operating arm 35 on shaft 32 may, in certain installations, be one and the same with control arm 39.

A link or connecting rod 45 depends from a pin 46 at the end of operating crank 34, and the lower end of connecting rod 45 connects to a stud 47 which projects from the back side of a pawl 48. Pawl 48 is hung at its upper end on pin 49, the latter being rigidly mounted in the pawl and carried loosely in an opening 50 in a lug 51 which is formed as a part of or welded to the upper end of tubular leg 14. Lug opening 50 allows pin 49 a limited free vertical movement. The lower end of pawl 48 carries a head 52 adapted to fit the ratchet formation of teeth 17 and having an upwardly facing shoulder 53 adapted to engage upwardly against the downwardly facing shoulder 17a of the teeth 17. Pawl head 52 projects through an opening 55 in the tubular leg in order to project into engagement with the ratchet teeth. An upwardly facing shoulder 56, formed integrally with or rigid with respect to tubular leg 14, is adapted to press upwardly against the lower end face of pawl 48 when the weight of the trailer is being supported by the legs. This condition is shown in Fig. 2. In that condition shoulder 56 is pressing upwardly against the lower end surface of the pawl and the upwardly facing shoulder 53 of the pawl is pressing upwardly against one of the fixed downwardly facing ratchet shoulders 17a; and by that means the weight of the trailer is supported upon the legs. And, in that position of the parts, leg 14 and its lug 51 are raised, with relation to the pawl, slightly above the relative position shown in Fig. 4, the clearance in lug bore 50 allowing that.

The uppermost raised position of the leg is shown in Fig. 3, where the leg has been raised to its upper limit with box 20 in contact with the lower end of body 11. In this position operating shaft 32 and its attached operating crank 34 and arms 35 and 39 are in positions rotated counter-clockwise from the positions shown in Fig. 1 by an angle of about 120°. In this uppermost position leg 14 and all its connected parts are suspended from operating crank 34 through the connecting rod 45. The support of the leg from link 45 is through pawl 48. Stud 47 on the back of the pawl being offset from a vertical line through pivot 49, the pawl is swung into the angular position shown in Fig. 3, against the action of pawl spring 60. Stud 47 strikes a lug 61 on the inner face of tubular leg 14 to limit this angular position. In this position the pawl head 52 is withdrawn inwardly through opening 55 so that the pawl head does not project outwardly beyond the outer periphery of the tubular leg. With the pawl supported in the position illustrated, the tubular leg 14, and ground wheels 24, are then supported from pawl pivot 49 through the lug 51 which loosely engages that pivot pin. The action of lowering the supporting leg is essentially that of merely releasing the supporting pressure on diaphragm 36 and allowing the leg to drop. The main impelling force in lowering the leg is the weight of the leg and its connected parts. As mentioned before diaphragm spring 38 may aid somewhat in the action or, in some cases the diaphragm spring might act substantially to push the leg down. The action, however, is substantially the same in all such cases.

The leg is always lowered when the front end of the trailer is still supported upon the tractor, and in some instances the leg will drop to its lower stopped limit without ground wheels 24 reaching contact with the ground. The limit to downward movement of the leg is formed by a pair of stop lugs 70 which project from the upper end of pawl 48 and overhang the outer periphery of tubular leg 14 in such a manner as to strike an upwardly facing shoulder 71 which is formed on body 11 just above the ratchet teeth 17. With lugs 70 resting on shoulder 71, pawl head 52 is at an elevation where its upper shoulder face 53 is just slightly below the lowermost ratchet shoulder 17a; and the engagement of lugs 70 with shoulder 71 tends, together with spring 60, to move pawl head 52 towards the left and under that ratchet shoulder 17a. See Fig. 4. Then, when the trailer is lowered and its weight taken on ground wheels 24 and on the leg, the leg shoulder 56 comes up against the lower end of pawl 48, and the upper shoulder face 53 of pawl head 52 moves up against the ratchet shoulder 17a, to support the weight. As the leg 14 moves up the short distance with relation to pawl 48, the loose play in the bore at 50 around pawl pivot pin 49 allows the necessary short relative movement without placing any of the weight strain on pivot pin 49.

In other circumstances of operation the ground wheels will engage the ground or roadway before the leg has dropped to its lowermost position and before the pawl has reached a position to engage with the lowermost ratchet shoulder. The series of ratchet shoulders is provided for establishing the weight supporting connection between the supporting leg and body member 11 at various elevations, so as to make the support completely operative within all of the variable conditions usually encountered.

Assuming a ground condition in which the ground wheels engage the surface when pawl 48 has dropped to a position where its shoulder face 53 will then just enter under uppermost ratchet shoulder 17a, the operation is as follows. With the parts in the last defined position, and with the leg supported upon the ground we will assume that the weight of leg 14 and its attached parts has dragged the connecting rod 45 and its attached parts downwardly. This will usually be the case as spring 38 is usually light and, as will be seen, the movement of the parts also includes movement of connecting rod 40 and its attached parts, which constitutes a drag upon the movement. Consequently pawl 48 will reach a position opposite the uppermost ratchet shoulder (with pawl shoulder 53 at a level just below uppermost ratchet shoulder 17a) in a position, with relation to the leg, like that shown in Fig. 3; and the parts 39, 40, etc., will not have been impelled by spring 38 into movement ahead of the downward movement of the pawl, even if the connecting rod 45 be a simple open link.

Having reached the latter described position, the pawl head 52 is immediately moved toward the left and under uppermost ratchet shoulder 17a. This movement is caused by the constant pressure of spring 60, if by no other force. It may however be at least partially caused by the action of diaphragm spring 38 which may also tend to continue rotation of operating shaft 32 and operating crank 34 in a right-handed direction. If link 45 which constitutes the connecting rod is then provided with stop pins 45a (or what amounts to the same thing, if connecting rod 45 is made with solid bearings at each end instead of in the form of an open link) then the pressure of spring 38 will also be transmitted to pawl lug 47 to throw the lower end of the pawl toward the left and under the uppermost ratchet shoulder 17a.

In passing, it may be remarked that the stop pins 45a are in practice not found to be necessary as diaphragm spring is not usually heavy enough to itself move the parts in such manner as to lower link 45 below the position to which the link and the parts connected to it have been moved by the weight of the leg and by the pawl spring 60. Thus, in practice, link 45 may be a simple open suspension link. The head 47a of stud 47 extends out laterally beyond the diameter of the stud only in a horizontal direction. The link can be easily assembled with the stud by turning the link crosswise of the pawl, and the notches 14a in the upper end of leg 14 facilitate this assembly operation.

In any case, to enter the pawl under the uppermost ratchet shoulder, the supporting leg and the pawl will have moved down vertically to the specified elevation, and then, by a swinging movement of the pawl accompanied by further downward movement of link 45 and further rotation of operating shaft 32 and control arm 39, the leg 14 will be locked in position relative to body member 11. And it is that last mentioned locking movement which is utilized for unlocking or releasing the coupler in a manner now to be described. In the illustrative design shown in the drawings, the pivotal connection 39a, between control arm 39 and control rod 40, has just reached a point in its movement which is designated diagrammatically by the mark at 39b on the drawings, when the parts have gone through their final movement of locking the leg. In this position of the parts control rod 40 has just reached the position where its operated lock controlling parts have just unlocked or released the coupler. And in that last mentioned position of the parts, the controlling rod 40 and its operated parts have moved into the coupler releasing position during the last mentioned motion of pawl 48 into locking engagement with the ratchet shoulder 17a.

Figure 8:
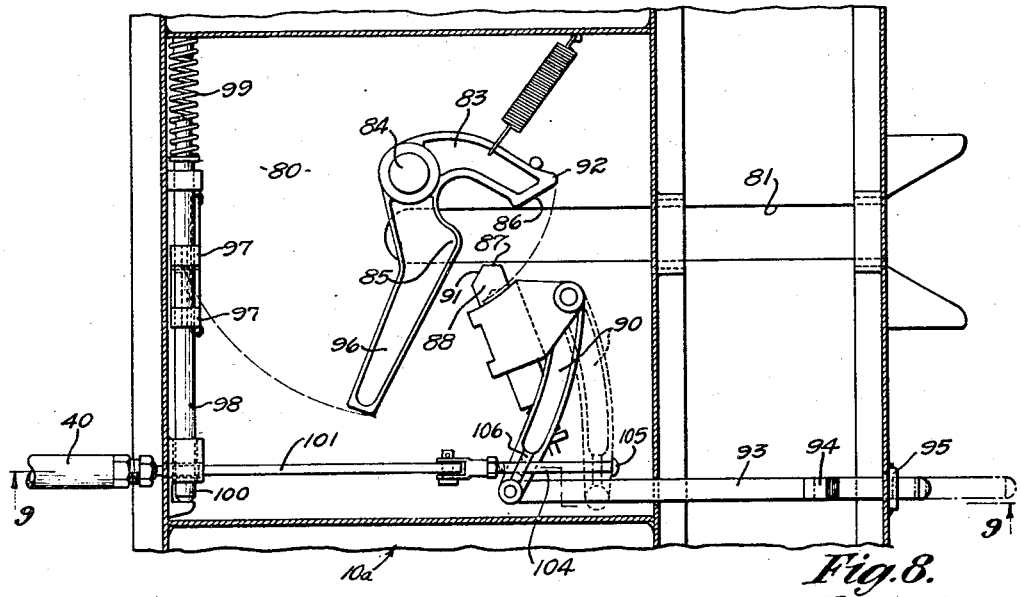
Fig. 8 is a similar view showing the parts in open position.
Figure 9:
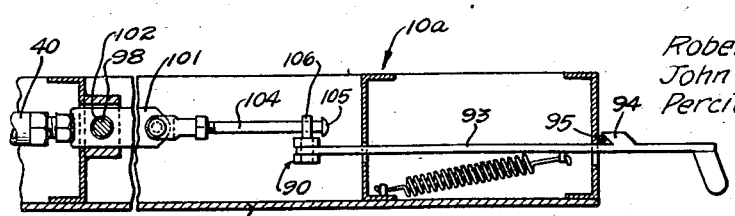
Fig. 9 is a longitudinal vertical section taken as indicated by line 9—9 on Fig. 8; but showing the parts in the position which is indicated by dotted lines in Fig. 8.

A typical form of coupler lock and controlling mechanism is shown in Figs. 7, 8 and 9. The forward part of the trailer frame is shown fragmentarily at 10a. This forward part of the frame includes a framing plate 80 upon which certain parts of the coupler and locking mechanism are mounted and which also has a longitudinal slot 81 through which the tractor king-pin 82 may enter by relative rearward motion. The coupler member 83 is in the form of a hook pivoted at 84 to swing between the positions shown in Figs. 7 and 8. The rearwardly moving king-pin strikes a shoulder 85 on the coupler to throw it to the closed position shown in Fig. 7. In moving to that closed position the beveled end 86 of the coupler member strikes upon the nose face 87 of spring-pressed latch bolt 88 to push the latch bolt back so that the coupler member finally reaches the position shown in Fig. 7 where it is locked by the spring-pressed latch bolt.

A latch operating lever has an arm 90 which lies in the position shown in full lines in Figs. 7 and 8 when the latch bolt is fully extended. To release the coupler the latch bolt is retracted far enough that its beveled nose face 91 will be engaged by nose 92 of coupler member 83 as the latter swings toward the open position of Fig. 8, so that the latch bolt will be pushed further back as the coupler swings open. In the arrangement as here shown the latch bolt is cocked in its partially withdrawn position, with lever 90 in the position shown in dotted lines in Fig. 8, by a manual setting which is accomplished by pulling outwardly on control bar 93 and hooking a hook 94 upwardly over a lug 95 on the frame. With the parts in such position (shown in Fig. 9) the latch bolt 88 is withdrawn far enough that coupler nose 92 then pushes the latch further back as the coupler opens. The accompanying slight forward movement of bar 93 and hook 94 releases the hook from lug 95 and the hook drops away from the lug so that when coupler nose 92 has passed the latch bolt the latch bolt then springs back to its fully projected position as shown in Fig. 8, ready to latch and lock the coupler immediately upon reinsertion of the king-pin and closure of the coupler to the position shown in Fig. 7.

Coupler member 83 has an extending arm 96 whose end engages between two lugs 97, mounted on a locking-pin 98, when the parts are in the locked position of Fig. 7. Locking pin 98 is slidable in a transverse direction, and is impelled by spring 99. In the position shown in Fig. 7 the locking nose 100 of locking-pin 98 is held back against the action of spring 99, by coupler arm 96, and in this position nose 100 just clears a longitudinal slidable control bar 101 which is attached to the forward end of and moves with the controlling rod 40. Control bar 101 has an aperture 102 of a size to take the locking pin 98 when the aperture comes into register with the locking pin. Aperture 102 is a little larger than the locking pin, for reasons which will hereinafter appear, but the relation of aperture 102 to control rod 40 is such that when pivot pin 39a in Fig. 1 has just reached the previously defined position indicated by 39b, then the forward edge of aperture 102 (the right hand edge in Fig. 7) has just moved forward far enough (toward the right in Fig. 7) that locking pin 98 can pass through the aperture to lock control bar 101 in position and to release coupler arm 96 to swing free of lug 97. Such condition of the parts is shown in Fig. 8, the release of arm 96 having allowed the coupler to open. However, in the particular locking mechanism which is here being described, the coupler cannot open until latch 88 is cocked, and until that occurs the coupler arm 96 holds lock pin 98 from entering aperture 102.

When control bar 101 moves forwardly to the last described position a control rod 104 moves forwardly with it. This rod 104 has a head 105 on its forward end, which lies just forward of a lug 106 on the outer end of latch lever 90 and, in the position of the parts shown in Fig. 7, prevents latch lever 90 from being moved forward to cock the latch. With the parts in the position which has been described—with locking aperture 102 just forward far enough to allow lock pin 98 to enter—rod head 105 is forward far enough to allow the latch to be manually cocked as before explained and to allow the subsequent short forward movement of latch lever 90 which accompanies the opening of the coupler. In that position of the parts, then when king-pin 82 is withdrawn by relative forward movement in slot 81, the coupler is thrown to the position shown in Fig. 8. The movement of coupler arm 96 allows spring 99 to push locking pin 98 through locking aperture 102. Locking pin 98 and its lugs 97 take the final position shown in Fig. 8, where arm 96 can swing out of its engagement between the lugs 97, and where that arm can reengage the lugs to retract the locking pin to the position of Fig. 7 when the coupler is again closed.

The operation of the coupler and its locking mechanism is such that the coupler is only released or unlocked when control bar 101 has reached the specified position, which it only reaches when the pawl 48 has reached a position at the level of the uppermost ratchet shoulder 17a and then has finally moved in under that ratchet shoulder. The coupler is thus finally released or unlocked by virtue of the final movement which takes place in connection with the final locking of the leg in its lowered position. The action of aperture 102 registering with lock pin 98 is an action which (disregarding the manual coupler release) directly releases or unlocks the coupler. The action of control rod 104 is one which releases the coupler lock to be manually unlocked; and this action, as well as the direct coupler release, does not take place until the locking pawl 48 goes through its final locking movement. In the appended claims we use the term "release," as applied to the coupler or draft lock, to mean either its complete unlocking, or its freeing to be subsequently unlocked.

Under other conditions of leg lowering, where the ground wheels do not strike the road surface until the leg has been lowered to lower levels, the coupler is released or unlocked by virtue of the movement of the leg below the level at which pawl head 52 reaches the level of the uppermost ratchet shoulder 17a. Whenever the leg moves down far enough to carry the pawl below that level, then the movement of the pawl, beyond the movement which is required to carry the pawl to that level, is a movement which at least puts the pawl potentially in a condition where it must lock the leg immediately upon upward movement of the leg with reference to body member 11.

For instance, it may be assumed that the leg has dropped to a position where the nose of pawl head 52 rides on a nose of one of the ratchet shoulders. In any such position, as soon as the leg is pressed relatively upwardly by the weight of the trailer coming upon it, then pawl head 52 will immediately be moved upwardly and outwardly into engagement with the ratchet shoulder 17a which is next above. The movement of the pawl below the level of uppermost ratchet shoulder 17a may therefore be viewed as the potential locking movement of the pawl if not the actual locking movement.

In any such potential locking position of the pawl, it may have travelled downwardly some distance below the level of the uppermost ratchet shoulder 17a. Arm 39 has correspondingly travelled to and past the point indicated by the numeral 39b, and control bar 101 has correspondingly been moved to and somewhat past the initial registering position which has been previously described. The relative position of arm 39 on shaft 32 is such that, during the travel of arm 39 from the point 39b to its position of ultimate travel with the leg furthest down (shown in Fig. 1) the arm 39 travels through a short arc which is close to a "dead center" position. In Fig. 1 the dot-dash line labeled C represents the effective dead center line for the connecting control rod 40. Travel of arm 39 from point 39b to the position shown in Fig. 1 moves control rod 40 and control bar 101 only a slight distance beyond the position assumed by those parts when arm 39 is in the first registration position represented by point 39b. Locking aperture 102 is sufficiently elongated with respect to the size of locking pin 98, to keep the aperture in register with locking pin 98 at all times after arm 39 has passed the point 39b.

Figs. 10 to 16 illustrate a modified form of drop leg support which cooperates with the coupler and the coupler locking mechanism in the same manner as before described. In these figures the upper or body portion of the support is in the form of a tubular member 200 which is clamped in a clamp bracket 201, which bracket is directly mounted on a frame member 202 of the trailer. A brace or braces 203 give the mounting bracket a rigid support on the trailer frame. The tubular leg 204 slides vertically in the body tube 200 and carries a box 205 at its lower end similar to the box previously described for carrying the ground wheels, 206.

The operating shaft 207, with a crank 208, operating arm 209 and control arm 210, are all generally similar to the corresponding parts previously described, and the operating shaft and its connected parts are operated by a vacuum diaphragm 211 which is similar in structure and operation to that previously described. An aperture lug 199 welded on body tube 200 and clamped in the clamp bracket 201 makes provision for alining the body tube and for vertical adjustment. And the bearings of shaft 207 are likewise vertically adjustable by the arrangements shown at 198 in Figs. 13 and 15.

A connecting rod or link 212 depends from operating crank 208 and moves between the upper position shown in Fig. 10 and the lower position shown in Figs. 11 and 12. Connecting rod 212 in this form of device is double, and its lower end straddles a transverse pin 213 which is set in the upper part of tubular leg 204. Just below the transverse pin the lower end of link 212 carries pivot pin 214 on which the pawl 215 is dependingly mounted. Pawl 215 is carried between the two spaced parts of link 212 so that the upper end of the pawl pulls up against cross-pin 213 when links 212 are raised, and thus causes the whole drop leg to be raised whenever the parts are moved up to the position shown in Fig. 10. At its lower end pawl 215 has a head 216 with a curved lower surface which rides on an inclined guide 217 which is inserted in and carried by the tubular drop leg. The arrangement of the parts is such that the pawl assumes the position shown in Fig. 10 when the parts are raised, but is capable of assuming the position shown in Fig. 11 when the parts are lowered.

The tubular leg has a pawl projection opening 218 just above the transverse guide 217. In the lowermost dropped position of the leg, shown in Fig. 12, opening 218 is just below the lower end 219 of tubular body member 200. In that position of the parts further downward movement of link 212 has been stopped by crank arm 208 coming into contact with the inner surface of body tube member 200, as shown in Fig. 11, and the tubular drop leg is hanging on links 212 with the parts in the position shown in Fig. 12. In that position diaphragm spring 220 exerts sufficient force to hold crank arm 208 from being rotated in a counterclockwise direction by an upward push on link 212. Then, when the weight of the trailer is lowered onto the drop leg, leg 204 is pushed up into body tube 200. Inclined guide 217, by that upward movement, swings the lower end of pawl 215 outwardly toward the right from the position shown in Fig. 12 to the position shown in Fig. 11. In the latter position pawl head 216 rests upon guide 217 and is projected under the lower edge 219 of body tube 200. Drop leg 204 is thus locked in its lowermost position in which it supports the weight of the trailer.

In the description of operation which has just been given, the locking pawl has dropped along with the leg to the lowermost position, and then, with the pawl standing at a stationary level, the leg has moved back up a short distance and forced the pawl out into locking position. The last part of the downward movement of the pawl is therefore either its potential locking movement or its actual locking movement, depending on whether the leg has dropped clear down (Fig. 12) and then moved back up again, or has struck the ground in about the position of Fig. 11 and before reaching that of Fig. 12. In the latter case, with the leg in the position of Fig. 12, the last part of the downward movement of links 212, impelled by diaphragm spring 220, acts directly to force the pawl on downwardly and outwardly to the locking position of Fig. 11. In either mode of operation it is that last downward movement of the locking pawl which throws control arm 210 and its connected control rod 240 to the position where the coupler is unlocked or released for unlocking in the manner before described.

Figs. 13 and 14 show a yielding detent device which operates to hold the operating shaft 207, and crank 208, in the position of Figs. 11 and 13. An arm 225 is mounted on shaft 207 and carries a spring pressed detent ball 226 which engages a depression in plate 227. The detent action is sufficient to hold the parts in the position of Figs. 11 and 12 as the leg 204 is moved up by ground contact, thereby insuring that pawl 215 will be forced out rather than be forced up.

With the slight modification shown in Figs. 15 and 16, this device may also provide for hand operation of the support. In those figures arm 225 is extended to form an operating handle 228. Two depressions or bores 229 and 230 are formed in plate 227, the former to hold the parts in the position of Fig. 11, the latter to hold them in the position of Fig. 10 with the leg elevated. And instead of using a spring pressed detent ball, this modification uses a manually retractible spring pressed plunger 231.

We claim:

1. In a tractor and semi-trailer combination in which the tractor and trailer are provided with interengaging draft elements including a releasable draft lock on one vehicle adapted to lockingly engage the draft element of the other vehicle, and in which the trailer is provided with a support movable between supporting and non-supporting positions; the improvement which is characterized by the trailer support carrying a locking element for movement therewith and for limited locking movement with relation thereto to lock the support in supporting position, the support being movable between supporting and non-supporting positions by movement applied to the locking element, and interconnective means between the locking element and the draft lock operating to release the draft lock upon locking movement of the support locking element.

2. In a tractor and semi-trailer combination in which the tractor and trailer are provided with interengaging draft elements including a releasable draft lock on one vehicle adapted to lockingly engage the draft element of the other vehicle, and in which the trailer is provided with a support movable between supporting and non-supporting positions; the improvement which is characterized by the trailer support carrying a locking element for movement therewith and for limited locking movement with relation thereto to lock the support in supporting position, the support being movable between supporting and non-supporting positions by movement applied to the locking element, interconnective means between the locking element and the draft lock operating to release the draft lock upon locking movement of the support locking element, and support moving mechanism connected to the locking element and adapted by initial movement to move the support to supporting position and by final movement to give locking movement to the support lock.

3. In a tractor and semi-trailer combination in which the tractor and trailer are provided with interengaging draft elements including a releasable draft lock on one vehicle adapted to lockingly engage the draft element of the other vehicle, and in which the trailer is provided with a support movable between supporting and non-supporting positions; the improvement which is characterized by the trailer support having a lock operative by locking movement to lock the support in supporting position, support moving mechanism connected to the locking element and adapted by initial movement to cause movement of the support to supporting position and by final movement to give locking movement to the support lock, and interconnective means between the support moving mechanism and the draft lock operating to release the draft lock upon final support locking movement of the moving mechanism.

4. In a tractor and semi-trailer combination in which the tractor and trailer are provided with interengaging draft elements including a releasable draft lock on one vehicle adapted to lockingly engage the draft element of the other vehicle, and in which the trailer is provided with a support movable between supporting and non-supporting positions; the improvement which is characterized by the trailer support having a lock operative by locking movement to lock the support in supporting position, support moving mechanism connected to the locking element and adapted by initial movement to cause movement of the support to supporting position and by final movement to give locking movement to the support lock, and interconnective means between the support moving mechanism and the draft lock controlling the release of the draft lock.

5. In a tractor and semi-trailer combination in which the tractor and trailer are provided with interengaging draft elements including a releasable draft lock on one vehicle adapted to lockingly engage the draft element of the other vehicle, and in which the trailer is provided with a support movable between supporting and non-supporting positions; the improvement which is characterized by the support being in the form of a movable leg which may be raised and lowered, a lock element carried by the movable leg and movable with relation thereto, leg moving mechanism connected to the lock element, and interconnective means between the leg moving mechanism and the draft lock controlling the release of the draft lock.

6. In a tractor and semi-trailer combination in which the tractor and trailer are provided with interengaging draft elements including a releasable draft lock on one vehicle adapted to lockingly engage the draft element of the other vehicle, and in which the trailer is provided with a support movable between supporting and non-supporting positions; the improvement which is characterized by the support including a substantially vertical guide and a movable leg guided thereby, a pivoted locking pawl carried by the movable leg and adapted to swing transversely of the leg movement to lockingly engage the guide, leg moving mechanism connected to a point on the locking pawl which has a vertical component of movement as the pawl swings, and interconnective means between the leg moving mechanism and the draft lock controlling the release of the draft lock.

7. Support for a semi-trailer or the like; comprising the combination of a leg guiding member adapted to be secured to the trailer frame and having a downwardly facing locking shoulder, a movable leg slidable on the guide member in a vertical direction, a locking pawl loosely mounted on the leg to move both horizontally and vertically with reference thereto and adapted by horizontal movement to project under the locking shoulder of the guide, an upwardly facing shoulder on the leg adapted to bear upwardly on the pawl, and leg moving and suspending mechanism connected to the locking pawl.

8. Support as specified in claim 7, and in which the upwardly facing shoulder on the leg has an inclined face which forces the pawl into projected position when the leg is moved upwardly with reference to the pawl.

9. Support for a semi-trailer or the like; comprising the combination of a leg guiding member adapted to be secured to the trailer frame and having a downwardly facing locking shoulder, a movable leg slidable on the guide member in a vertical direction, a locking pawl mounted on the leg to move both horizontally and vertically with reference thereto and adapted by horizontal movement to project under the locking shoulder of the guide, the pawl mounting allowing the pawl a limited loose vertical movement with reference to the leg, an upwardly facing shoulder on the leg adapted to contact with and bear upwardly on the pawl when the leg moves upwardly with reference to the pawl through a distance less than the relative vertical looseness between the leg and pawl, and leg moving and suspending mechanism connected to the pawl.

10. Support for a semi-trailer or the like; comprising the combination of a leg guiding member adapted to be secured to the trailer frame and having a downwardly facing locking shoulder, a movable leg slidable on the guide member in a vertical direction, a locking pawl dependingly pivoted on the leg and having a head at its lower end adapted to be projected horizontally under the locking shoulder of the guide, and leg moving and suspending mechanism connected to a point on the pawl which is offset horizontally from a vertical line through the pawl pivot, so that the weight of the leg tends to retract the projectible head of the pawl, the pawl being loosely pivoted to the leg, and the leg having an upwardly facing shoulder adapted to bear on the pawl head.

11. Support for semi-trailers or the like, comprising the combination of a tubular body member adapted to be secured to a trailer frame and to form a vertically extending tubular guide, a series of vertically spaced downwardly facing locking shoulders on the body member, a tubular leg vertically slidable in the body member, a pawl pivotally mounted at its upper end on the leg and depending within the leg, the leg wall having an opening and the pawl having an outwardly projecting head at its lower end adapted to be projected through the opening and under any one of the locking shoulders on the body, and means urging the pawl head outwardly.

12. Support for semi-trailers or the like, comprising the combination of a tubular body member adapted to be secured to a trailer frame and to form a vertically extending tubular guide, a series of vertically spaced downwardly facing locking shoulders on the body member, a tubular leg vertically slidable in the body member, a pawl pivotally mounted at its upper end on the leg and depending within the leg, the leg wall having an opening and the pawl having an outwardly projecting head at its lower end adapted to be projected through the opening and under any one of the locking shoulders on the body, and a spring urging the pawl head outwardly.

13. Support for semi-trailers or the like, comprising the combination of a tubular body member adapted to be secured to a trailer frame and to form a vertically extending tubular guide, a series of vertically spaced downwardly facing locking shoulders on the body member, a tubular leg vertically slidable in the body member, a pawl pivotally mounted at its upper end on the leg and depending within the leg, the leg wall having an opening and the pawl having an outwardly projecting head at its lower end adapted to be projected through the opening and under any one of the locking shoulders on the body, a connection lug extending from the inner face of the pawl and lying inside a vertical line passing through the pawl pivot, and leg moving mechanism connecting to the connection lug.

14. Support for semi-trailers or the like, comprising the combination of a tubular body member adapted to be secured to a trailer frame and to form a vertically extending tubular guide, a downwardly facing locking shoulder on the body member, a tubular leg vertically slidable in the body member, the leg wall having an opening, an inclined pawl-engaging shoulder extending across the interior of the tubular leg below the opening, a leg moving link depending into the leg, a pawl mounted on the lower end of the link and having a head adapted to contact the inclined shoulder and to be projected through the opening, and a stop secured to the leg to limit upward movement of the pawl and link with reference to the leg.

15. Support for a semi-trailer or the like; comprising the combination of a leg guiding member adapted to be secured to the trailer frame and having a downwardly facing locking shoulder, a movable leg slidable on the guide member in a vertical direction, a locking pawl mounted on the leg to have a limited movement with reference thereto both horizontally and vertically and adapted by horizontal movement to project under the locking shoulder on the guide, said relative pawl movement being so constrained that its relative horizontal and vertical movements are interdependent, a draft coupler lock, and connection between the locking pawl and the coupler lock whereby the relative vertical movement of pawl both upwardly and downwardly is transmitted positively to the coupler lock.

ROBERT M. BARNHART.
JOHN C. BENNETT.
PERCIVAL M. HEINMILLER.